United States Patent [19]
Snowdon et al.
[11] Patent Number: 4,877,473
[45] Date of Patent: Oct. 31, 1989

[54] METHOD OF MAKING A BAG PACK

[75] Inventors: Michael Snowdon, East Providence, R.I.; Jay Shapiro, Sandwich, Mass.

[73] Assignee: Beresford Packaging, Inc., Taunton, Mass.

[21] Appl. No.: 156,339

[22] Filed: Feb. 16, 1988

[51] Int. Cl.⁴ ......................... B32B 31/18; B32B 31/20
[52] U.S. Cl. .................................... 156/204; 156/227; 156/244.13; 156/244.18; 156/244.19; 156/250; 156/308.4; 493/405
[58] Field of Search ...................... 156/73.1, 227, 196, 156/198, 199, 204, 244.11, 244.13, 244.18, 244.19, 250, 252, 253, 257, 272.2, 308.2, 308.4, 309.6; 493/405; 206/554, 806; 383/9

[56] References Cited

U.S. PATENT DOCUMENTS 4,676,378 6/1987 Baxley ................................ 206/554

FOREIGN PATENT DOCUMENTS 0976397 10/1975 Canada .

*Primary Examiner*—Merrell C. Cashion, Jr.
*Attorney, Agent, or Firm*—Henry D. Pahl, Jr.

[57] ABSTRACT

In the bag pack disclosed herein, a plurality of thermoplastic "T-shirt-type" carry bags are joined together in a pack by both a hot weld around a central rack-mounting aperture and also by readily frangible pressure bonds linking the film layers forming the bag handles to allow for handle support while on a rack dispensing system. A "pull tab" adjacent the aperture is provided to allow easy opening of each bag in the pack.

5 Claims, 5 Drawing Sheets

METHOD OF MAKING A BAG PACK

BACKGROUND OF THE INVENTION

The present inventionrelates to a method of making a pack of thermoplastic T-shirt-type carry bags and more particularly to a method of making which permits the individual bags to be mounted on a handle supported dispensing rack system and be easily separated and dispensed from the pack utilizing a central "pull tab".

It has heretofore been known to form so-called T-shirt-type bags into packs which can be dispensed from a wire rack, each bag in succession being held on the rack for filling. Such bag packs and dispensing racks are, for example, disclosed in U.S. Pat. Nos. 4,480,750; 4,529,090 and 4,676,378. While bag packs and dispensing systems of this character have achieved considerable acceptance, a continuing problem has been the extracting of individual bags from the pack and orienting them on the wire dispensing rack for easy filling. As is understood, such T-shirt-type bags are typically constructed of relatively thin plastic film material so that the bags are not easily separated from the pack or once separated are not easily opened so as to permit filling.

Among the several objects of the present invention may be noted the provision of a novel form of pack of T-shirt-type bags; the provision of such a pack in which individual bags are easily separated from the pack; the provision of such a pack which may be easily mounted on a wire dispensing rack where individual bags may be easily held in an open position for filling; the provision of a method of making such a bag pack which is efficient and inexpensive. Other objects and features will be in part apparent and in part pointed out hereinafter.

SUMMARY OF THE INVENTION

A flattened gusseted tube of thermoplastic film is heat sealed and cut along transverse lines at periodic intervals thereby to form a series of enclosures which are then stacked. A central portion is cut out of the stacked enclosures at one end thereby to form from each enclosure a bag having a front wall and a back wall defining an article receiving opening with loop handles at each side of the opening. The handles are apertured between the article receiving opening and the distal ends of the handles for receiving spaced support rods. A point contact frangible pressure bond links the film layers forming each of the handles at a point intermediate the support rod receving apertures and the distal ends of the handle. These frangible bonds secure the bags in the pack for handling and cause each bag to open as it is pulled away from the pack. Preferably, the central cut out portion provides for a mounting tab upstanding from the front and back walls. These tabs are bonded together and apertured for receiving a holding hook. Further, the tabs are slit across a majority of their width below the hook receiving apertures, the slit including an arched central portion forming a sub tab or pull tab which is easily separated from the pack and grapsed.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
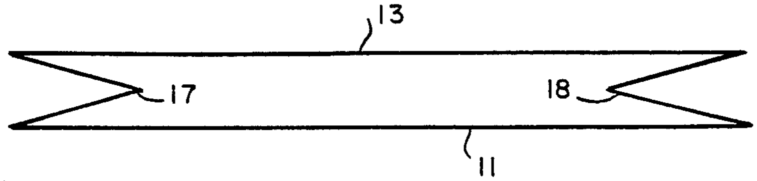
FIG. 1 is a end-on view of a flattened gusseted tube of thermoplastic film suitable for forming T-shirt-type bags.

As is conventional, the T-shirt-type bags utilized in the bag pack of the present invention are formed from a flattened gusseted tube of a suitable thermoplastic film material such as high molecular weight, high density polyethylene. Thickness between one-half and one mil are typical. The flattened tube is illustrated in FIG. 1. The tube comprises a front wall 11, a back wall 13 and gussets 15 and 16 extending inwardly to inner folds 17 and 18.

Figure 2:
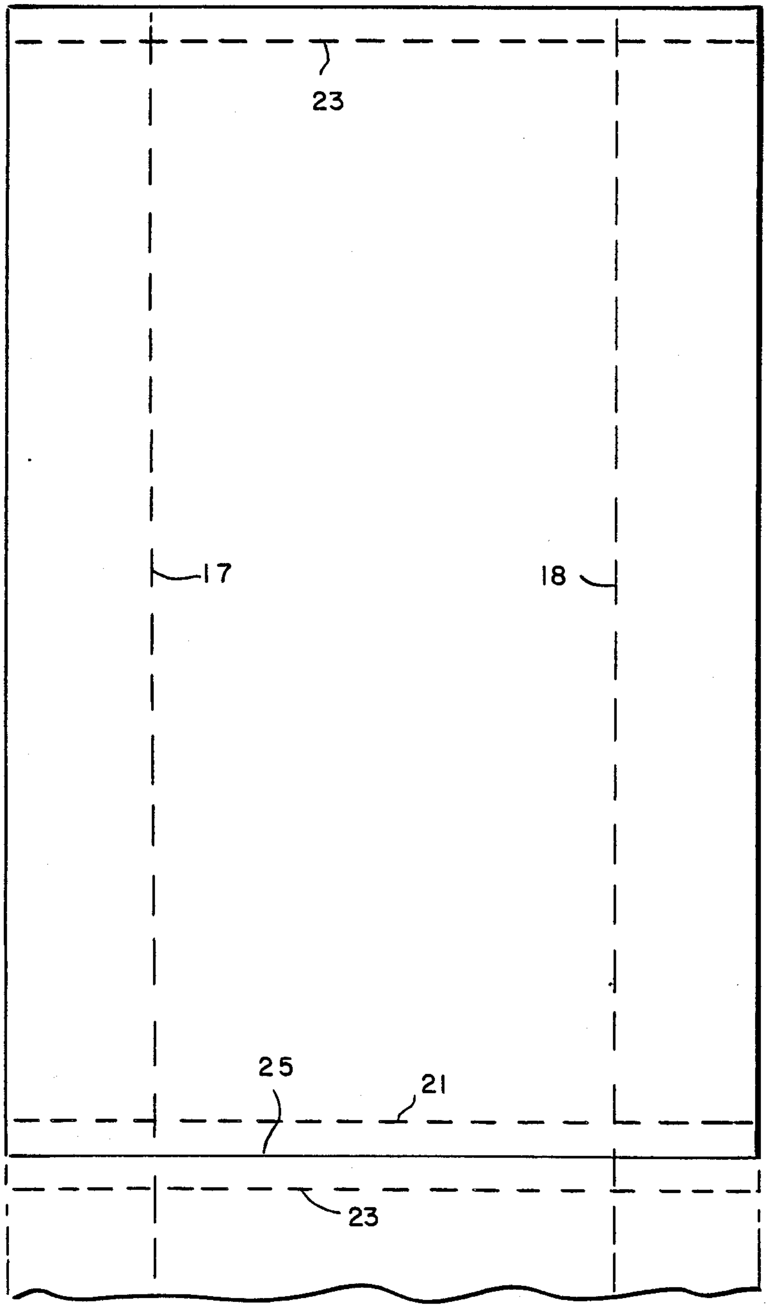
FIG. 2 is a plan view of an enclosure formed by transversely heat sealing and cutting the tube of FIG. 1 at periodic intervals.
Figure 3:
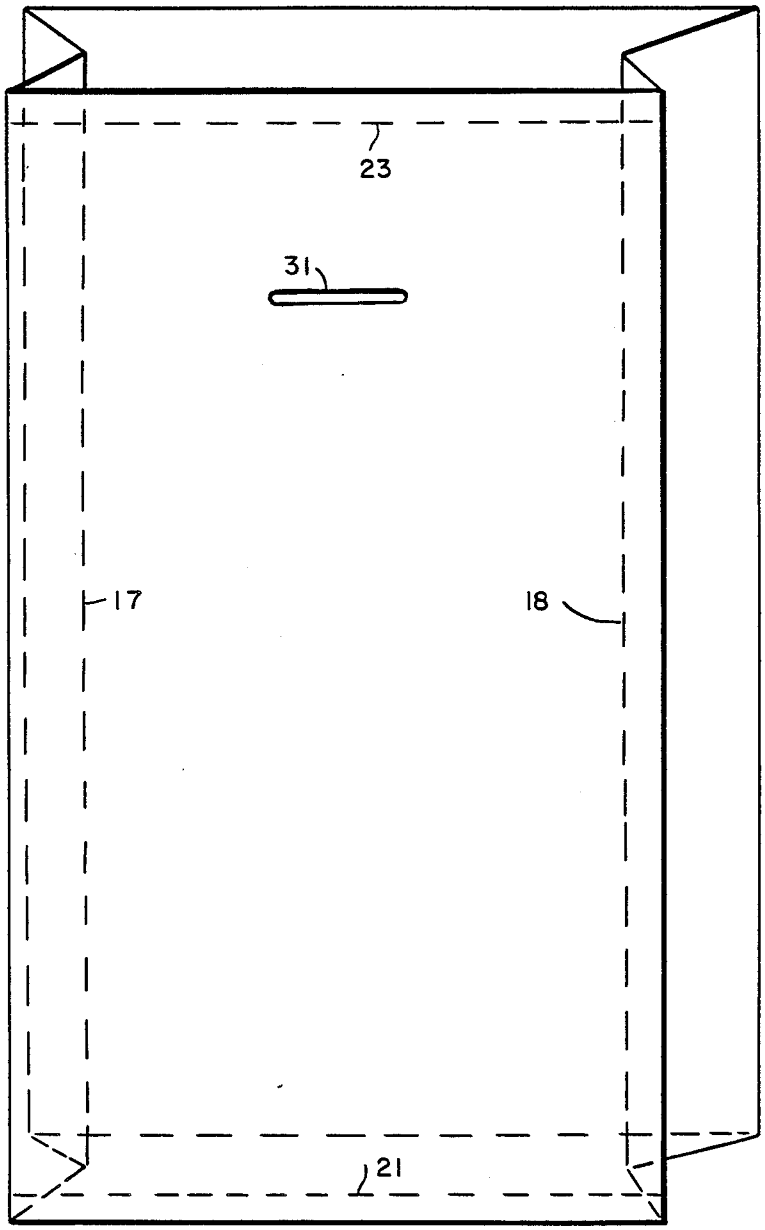
FIG. 3 is a plan view of a stack of the enclosures of FIG. 2, heat bonded together around a hook receiving aperture.

As illustrated in FIG. 2, a continuous length of the tube of FIG. 1 can be formed into a succession of enclosures by periodically along the length of the tube forming a pair of transverse heat seal lines 21 and 23 and by cutting the successive enclosures apart along a line between the heat seal lines, this cut line being designated by reference character 25. An alternative is to employ a periodic transverse heat seal which itself provides both a heat seal and cut-off. A suitable number, e.g. 50 or 100, of the enclosures are stacked in registration. The stack is then apertured as illustrated in FIG. 3 using a hot die or knife which bonds the film layers together around the created aperture. This aperture is indicated by reference character 31 in FIG. 3 and, as will be described in greater detail hereinafter, this aperture provides a means for mounting the bag pack on a hook which is part of a bag-dispensing rack.

Figure 4:
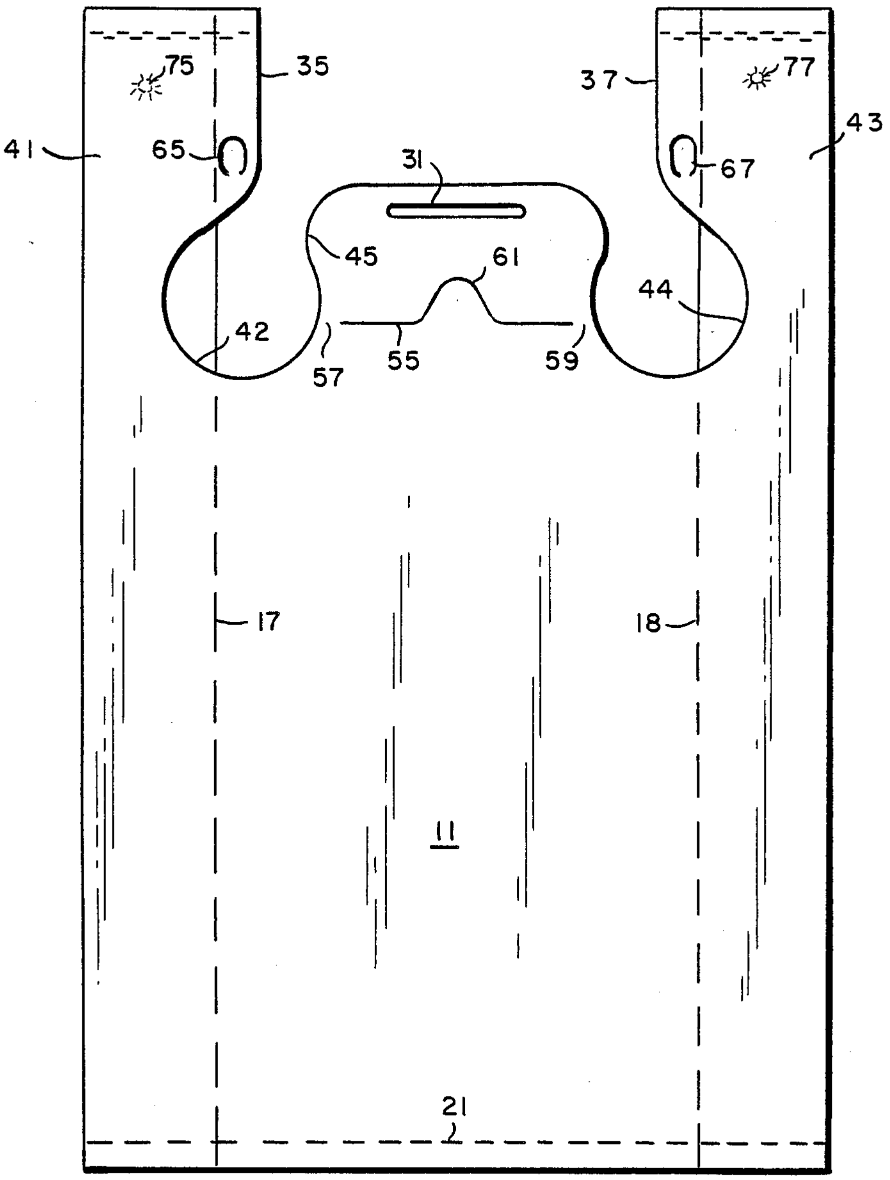
FIG. 4 is a plan view of a completed bag pack made in accordance with the present invention.
Figure 5:
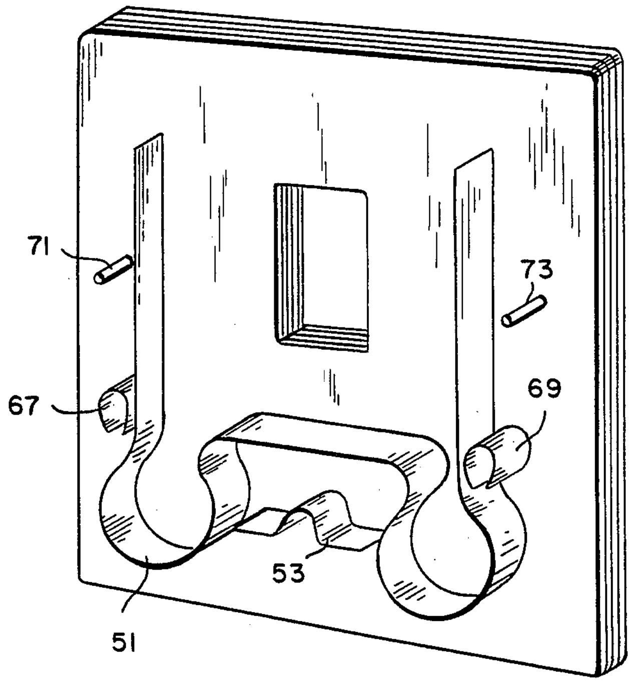
FIG. 5 is perspective view of a cutting and pressure bonding die used in manufacturing the bag pack of FIG. 4.

After the stacked enclosures are apertured and bonded together as described with reference to FIG. 3, it is taken to a die cutter where, in a single step, a plurality of cuts are made and, at the same time, a frangible pressure bond is created as described in greater detail hereinafter. The die itself is illustrated in FIG. 5 and it operates to form the completed bag pack as illustrated in FIG. 4. In particular, the die cuts out a generally rectangular central portion at one end of the bag pack. The sides of the central cut out, designated by reference characters 35 and 37, overlap the inner gusset folds 17 and 18 so that the remaining portions of the enclosure to either side of the cut out form loop handles, these handles being designated generally by reference characters 41 and 43.

Figure 6:
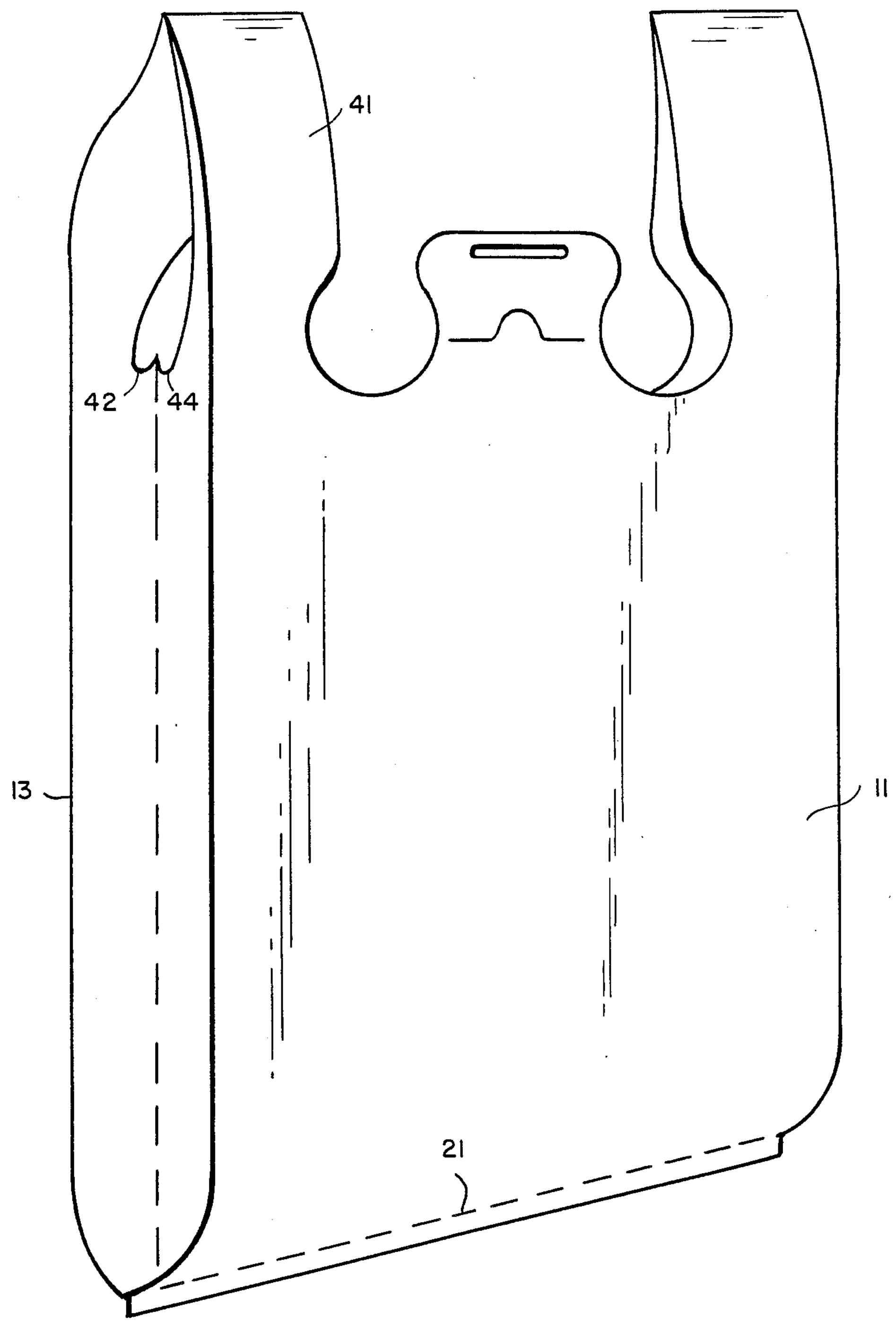
FIG. 6 is a side view of a completed bag opened to show the gusset cut out shape.

While the cut out area is generally rectangular, it includes, at each inner corner, a rounded region which projects outwardly from the cut out area and which essentially straddles the respective gusset fold. These rounded projecting regions are designated by reference characters 42 and 44 in FIG. 4. Accordingly, when the bag is opened, the gusset cut out itself is well rounded and devoid of any tear initiating notch. The shape of the opened gusset is illustrated in FIG. 6. The shape of the die also provides for mounting tabs 45 which extend upwardly from the front and back walls of the bag. As may be seen in FIG. 4, these tabs encompass the hook receiving aperture 31.

As may be seen from FIG. 5, the central cut out is formed by a thin, convoluted blade 51 on the die assembly. The die also carries a blade 53 which forms a slit 55 which substantially traverses the width of each tab 45 leaving at each side only a small easily torn region, these regions being designated by the reference characters 57 and 59. The slit 55 includes an arched central portion, designated by reference character 61. The portion of the front wall under this arched portion 61 in effect forms a sub tab or pull tab. This pull tab can easily be grasped and used to pull the front wall away from the back wall severing the regions 57 and 59, leaving behind the portion of the tab above the slit 55.

The die assembly of FIG. 5 also includes a pair of blades 67 and 69 which are in the form of interrupted circles or ellipses. These blades form apertures in each of the handles intermediate the respective rounded region 42 or 44 and the distal end of the respective handle. The tabs formed by these nearly circular cut outs are not bonded together and thus remain with the respective handle panels as the bags are separated on the dispensing rack support rods.

In addition to the several cutting blades, the die assembly of FIG. 6 includes two projecting rods 71 and 73. The tips of these rods are in the form of shallow or blunt cones so that, when the die assembly is pressed into the pack, point contact pressure bonds or cold welds are formed which link together the several film layers. These pressure bonds are designated by reference characters 75 and 77 in FIG. 4. Unlike the heat sealing or hot welding used to form the ends of the enclosures or the apertures 31, the pressure bonds 75 and 77 are frangible and relatively easily broken apart. As may be seen in FIG. 4, the pressure bonds 75 and 77 are formed in the handles 41 and 43 at a position between the respective support rod receiving apertures 65 and 67 and the distal ends of the respective handles.

Figure 7:
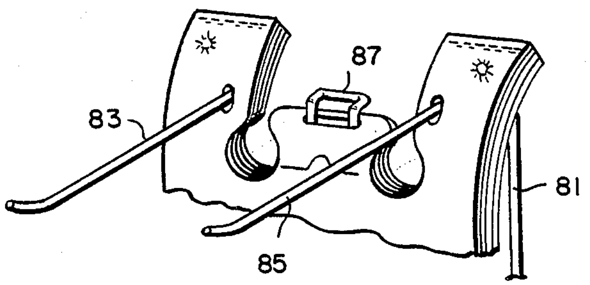
FIG. 7 is a perspective view of a completed bag pack of the present invention mounted on a wire dispensing rack.

When the bag pack of the present invention is mounted on a dispensing rack 81 as illustrated in FIG. 7, and the sub tab 61 is pulled away from the pack, the front wall of the bag will move outward pulling the handle apertures 65 and 67 over the support rods. The frangible pressure bonds linking the film layers will tend to hold back the rearward panel of each handle thus opening the handle loops and aiding in opening the bag for filling. In addition, the pressure bonds 75 and 77 aid in maintaining the multiple bags making up a pack in alignment during handling before the pack is mounted on the support rods and the tab aperture 31 is placed over the hook; otherwise, as it will be understood by those skilled in the art, the heat bond around the tab aperture 31 is not of sufficient area to prevent rotation or skewing of successive bags in the pack around the aperture 31 and such skewing would make it difficult to place the bag pack upon the rack 81.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. The method of forming a bag pack comprising:
   - forming a flattened gusseted tube of thermoplastic film;
   - heat sealing and cutting said tube along transverse lines at periodic intervals thereby to form enclosures;
   - stacking a plurality of said enclosures;
   - at one end of the enclosures in the stack, cutting out a central portion thereof overlapping the gusset regions thereby to form from each enclosure a bag having front and back walls defining an article receiving opening with loop handles at each side of the opening;
   - aperturing said handles intermediate said article receiving openings and the distal ends of said handles for receiving spaced support rods for holding the pack for dispensing; and
   - applying pressure locally without heat at a point intermediate said support rod receiving aperture and the distal end of the handle thereby to form a frangible pressure bond linking the film layers forming each of said handles.

2. The method as set forth in claim 1 wherein the central portion cut out also provides for a mounting tab upstanding from the front and back walls.

3. The method as set forth in claim 2 further comprising the step of cutting a hook receiving aperture in the distal part of said tab and for heat bonding together the tabs in a pack around said hook receiving aperture.

4. The method as set forth in claim 3 further comprising the step of slitting said tabs across a majority of their width along a line which traverses each tab below the hook receiving apertures leaving an easily tearable region on each side of the slit, the slit including an upwardly arched central portion forming a pull tab which is easily separated from the pack and grasped to permit the front wall to be pulled away from the pack.

5. The method of forming a bag pack comprising:
   - forming a flattened gusseted tube of thermoplastic film;
   - heat sealing and cutting said tube along transverse lines at periodic intervals thereby to form enclosures;
   - stacking a plurality of said enclosures;
   - at one end of the enclosures in the stack, cutting out a generally rectangular central portion thereof overlapping the gusset regions thereby to form from each enclosure a bag having front and back walls defining an article receiving opening with loop handles at each side of the opening, said central portion cut out also providing for a mounting tab upstanding from the front and back walls;
   - cutting a hook receiving aperture in the distal part of said tab and for heat bonding together the tabs in a pack adjacent said hook receiving aperture;
   - slitting said tabs across a majority of their width along a line which traverses each tab below the hook receiving apertures leaving an easily tearable region on each side of the slit, the slit including an upwardly arched central portion forming a pull tab which is easily separated from the pack and grasped to permit the front wall to be pulled away from the pack; and aperturing said handles adjacent the cut out central portion intermediate said article receiving openings and the distal ends of said handles for receiving spaced support rods for holding the pack for dispensing.

* * * * *